United States Patent [19]
Breslau et al.

[11] Patent Number: 5,761,512
[45] Date of Patent: Jun. 2, 1998

[54] AUTOMATIC CLIENT-SERVER COMPLIER

[75] Inventors: Franklin Charles Breslau, Teaneck, N.J.; Paul Gregory Greenstein, Croton-On-Hudson; John Ted Rodell, Wappingers Falls, both of N.Y.

[73] Assignee: International Business Machines Corporation, Armonk, N.Y.

[21] Appl. No.: 579,460

[22] Filed: Dec. 27, 1995

[51] Int. Cl.$^6$ ............................................. G06F 9/45
[52] U.S. Cl. ................................ 395/705; 395/703
[58] Field of Search ............................. 395/703, 705

[56] References Cited

U.S. PATENT DOCUMENTS 5,313,635  5/1994  Ishizuka et al. ............... 395/700
5,381,534  1/1995  Shi ............................... 395/200

*Primary Examiner*—Alvin E. Oberley
*Assistant Examiner*—R. S. Rosenhoem
*Attorney, Agent, or Firm*—Edward H. Duffield, Esq.; Heslin & Rothenberg, P.C.

[57] ABSTRACT

In an object-oriented computer system having multiple execution environments, a source code of a computer program is provided having multiple classes therein. The classes have affinities for execution environment type characteristics defined therewith. For each class, an execution environments is determined that satisfies the affinities of the class, and the class is compiled for the determined execution environment. As examples, affinities may include those directed toward processors, operating systems, user interfaces and software resources.

22 Claims, 5 Drawing Sheets

AFFINITY RESOURCE TABLE (ART)

| AFFINITY | DESCRIPTION | LOCATION |
|---|---|---|
| GUI | ANY GUI | SYS A, SYS B, SYS C |
| GUI_OS/2PM | OS/PM | SYS A |
| GUI_WIN | WINDOWS | SYS B, SYS A |
| GUI_XWIN | X-WINDOWS | SYS C |
| ... | ... | |
| DB | ANY DB | SYS C |
| DB_REL | ANY RELATIONAL DB | SYS C |
| DB_DB2 | DB2 | SYS C |
| DB_HIER | ANY RELATIONAL DB | — |
| DB_IMS | IMS | — |
| ... | ... | |
| PRT | ANY PRINTER | SYS A, SYS C |
| PRT_LINE | ANY LINE PRINTER | SYS C |
| PRT_GRAPH | ANY GRAPHICS PRINTER | SYS A, SYS C |
| PRT_4019 | 4019 | SYS A |
| PRT_4029 | 4029 | — |
| PRT_3820 | 3820 | SYS C |
| ... | ... | |

GENERAL RESOURCE AFFINITY

| | | |
|---|---|---|
| SYS A | SYSTEM A | SYS A |
| SYS B | SYSTEM B | SYS B |
| SYS C | SYSTEM C | SYS C |
| ... | ... | |

SYSTEM AFFINITY

*fig. 1A*

| | | HARDWARE AFFINITY |
|---|---|---|
| INTEL | INTEL | SYS A, SYS B |
| INTEL_486 | 80486 | SYS A, SYS B |
| S390 | S/390 | SYS C |
| S390_3090_400 | S/390 3090/400 | SYS C |

| | | OPERATING SYSTEM AFFINITY |
|---|---|---|
| OS2 | OS/2 | SYS A |
| OS2_20 | OS/2 2.0 | — |
| OS2_21 | OS/2 2.1 | SYS A |
| WIN | WINDOWS | SYS B |
| WIN_31 | WINDOWS 3.1 | SYS C |
| MVS | MVS | SYS C |
| MVS_ESA | MVS/ESA | SYS C |
| MVS_ESA_310 | MVS/ESA SP3.1.0 | SYS C |

*fig. 1B*

SYSTEM ENVIRONMENT TABLE (SET)

| SYSTEM | HW | OS |
|---|---|---|
| SYS A | INTEL 486 | OS/2 2.1 |
| SYS B | INTEL 486 | WIN 3.1 |
| SYS C | S/390 MODEL 3090-400 | MVS/ESA V3.1 |
| ... | ... | ... |

*fig. 2*

AUTOMATIC CLIENT-SERVER COMPILER

TECHNICAL FIELD

The present invention pertains in general to compilers. More specifically, the present invention is directed to a system and method for automatically compiling object classes in an object-oriented, e.g., client-server environment.

BACKGROUND OF THE INVENTION

Client-server computing techniques have gained widespread industry use in connection with computer applications. The client-server computing environment is one in which portions (e.g., procedures) of an application program execute on one computer and are considered "server" portions, while other portions execute on another computer and are considered "client" portions. The client portions call upon the server portions to accomplish specific tasks. The determination of which computer functions as a client, and which computer functions as a server, varies with each function performed, such that a single computer may act as a server for some functions and as a client for others.

The conventional programming methodology used for constructing client and server procedures is to separately create such procedures for their respective execution environments. For example, a server procedure intended for execution within a mainframe execution environment would be written and compiled for the mainframe execution environment. Similarly, for example, a client procedure intended for execution within a personal computer execution environment would be written and compiled for the personal computer execution environment. Separate source code files are created for each of the server and client procedures. Tracking and maintaining such separate source code files becomes more difficult as the number of procedures, interdependencies therebetween and execution environments involved in the client-server application program under development increases.

Object-Oriented Programming techniques have been applied to the client-server environment. Individual client and server classes are defined, and objects instantiated therefrom are compiled to run in predesignated execution environments. These objects include procedures used to carry out client and server functions. As discussed above, individual source code files must be maintained for the classes for each separate execution environment. Further, the programmer must have knowledge of the runtime execution environment of each class and predesignate where objects instantiated from each class will execute. Such preassociation reduces flexibility in system configuration and change.

The present invention is directed toward solutions to the above-noted problems.

DISCLOSURE OF THE INVENTION

In a first aspect, the present invention operates in an object-oriented computing system that includes multiple execution environments. The invention includes a method of automatically compiling an object defined by (i.e., instantiated from) a class by providing, to the computer system, the object defined by the class. The class has an affinity defined therewith that corresponds to an execution environment-type characteristic. An execution environment is automatically determined that has the affinity, and is referred to as a selected execution environment. The object defined by the class is then automatically compiled for the selected execution environment.

As an enhancement, the method may include providing the object-oriented computing system with an affinity resource table that includes multiple affinity entries. Each affinity entry includes an affinity value and at least one execution environment having the affinity value. The automatically determining may then comprise looking-up the affinity in the affinity values of the affinity resource table and selecting the execution environment from the at least one execution environments corresponding to the affinity value looked-up in the affinity resource table.

As a further enhancement, the object defined by the class may be provided wherein the class has multiple affinities defined therewith. The automatically determining may then include looking up each affinity of the multiple affinities in the affinity values of the affinity resource table, and determining the selected execution environment as a common execution environment to each affinity value looked up within the affinity resource table. If multiple execution environments are common to each affinity value looked-up in the affinity resource table, the method may also include randomly selecting one execution environment common to each affinity value looked-up in the affinity resource table as the selected execution environment.

As yet another enhancement, the method may include providing the object-oriented computing system with a system environment table that includes multiple system entries. At least one of the system entries has an execution environment and at least one compilation parameter for the execution environment. The automatically compiling may then include looking-up the selected execution environment in the system environment table, and compiling the object defined by the class using the at least one compilation parameter corresponding to the selected execution environment within the system environment table. The at least one compilation parameter may include, e.g., a processor type and an operating system.

Systems corresponding to the methods discussed herein are also disclosed.

The present invention has several advantages and features associated with it. Objects defined by classes, and included within a single source code file are automatically compiled for execution environments that satisfy affinities of the classes. Accordingly, a programmer no longer has to manually evaluate the characteristics of different execution environments with regard to the requirements of individual classes. Furthermore, regardless of the execution environment that the individual objects will be compiled for, the objects may all originate in a single source code file (as opposed to individual source code files for the objects of each execution environments). Maintenance and management of source code is thus simplified.

BRIEF DESCRIPTION OF THE DRAWINGS

The subject matter regarded as the present invention is particularly pointed out and distinctly claimed in the concluding portion of the specification. The invention, however, both as to organization and method of practice, together with further objects and advantages thereof, may best be understood by reference to the following detailed description taken in conjunction with the accompanying drawings in which:

FIGS. 1A–1B depict an example of an Affinity Resource Table ("ART") used in connection with an embodiment of he present invention;

FIG. 2 depicts one example of a System Environment Table ("SET") used pursuant to one embodiment of the present invention;

DETAILED DESCRIPTION OF A PREFERRED EMBODIMENT

The techniques of the present invention enable the automatic compilation of objects defined by classes for execution environments that satisfy requirements of the classes. Each class has its own affinity (or affinities) that specifies execution environment characteristics desired by the class. For example, a database related class may have an affinity for an execution environment having a database; and a graphics related class may have an affinity for an execution environment that supports a Graphical User Interface ("GUI"). The techniques disclosed herein enable object compilation for execution environments corresponding to the object's classes' affinities.

As used herein, the term "execution environment" is defined as the combination of hardware and software that supports an executing program (e.g., an object instantiated from a class), wherein a program will only properly execute within a specific execution environment if it is compiled for that execution environment. As examples, different execution environments include, e.g., an "IBM" mainframe computer executing a Multiple Virtual Storage ("MVS") operating system, an "IBM" mainframe computer executing a Virtual Machine ("VM") operating system, an "INTEL" processor based personal computer executing an "IBM OS/2 WARP" operating system, an "INTEL" processor based personal computer executing a "MICROSOFT WINDOWS 95" operating system, and a "Power PC" based computer executing a "UNIX" operating system. One of ordinary skill in the art will understand that, for a computer program to run in a native mode (i.e., noemulation), within a given execution environment, the program must be specifically compiled for that execution environment.

Figure 4:
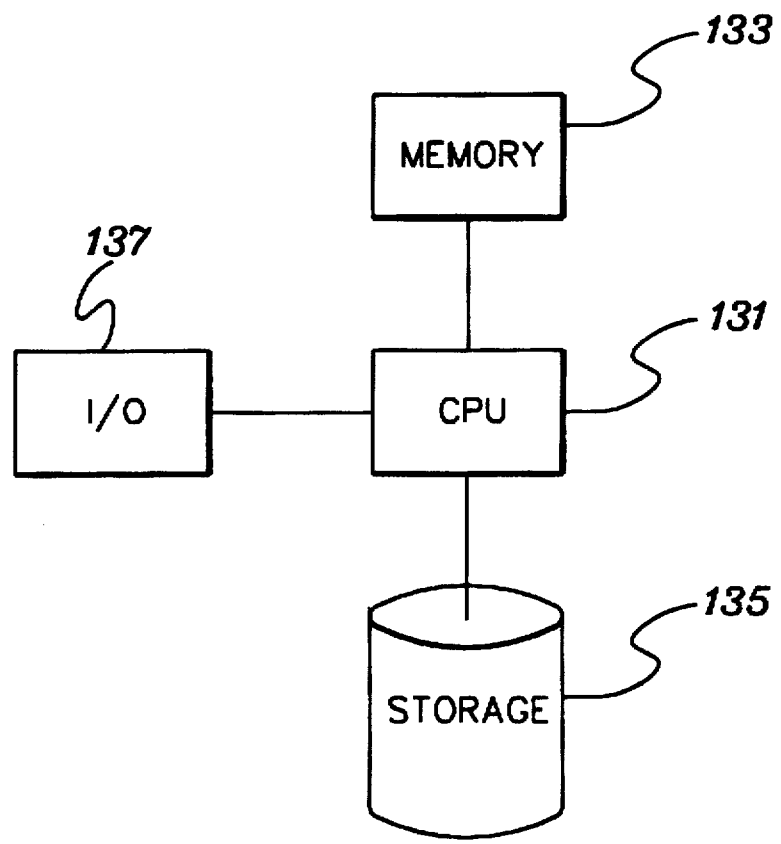
FIG. 4 is a diagram of one example of a system useful in implementing embodiments of the present invention.

One example of the hardware elements of one execution environment of the computer system used to implement the techniques of the present invention are shown in FIG. 4. A central processing unit ("CPU") 131 provides main processing functionality. A memory 133 is coupled to CPU 131 for providing operational storage of programs and data. Memory 133 may by, for example, random access memory ("RAM") or read only memory ("ROM"). Non-volatile storage of, for example, data files and programs is provided by a storage 135 that may be, for example, disk storage. Both memory 133 and storage 135 are computer usable media that may store computer program products as computer readable program code. User input and output are provided by a user input/output ("I/O") facility 137. User I/O facility 137 may include, for example, a graphical display, a mouse and/or a graphics tablet. As an example, the execution environment of FIG. 4 may be an "ES/9000" Mainframe Computer System executing an "MVS" ("Multiple Virtual Storage") operating system form "IBM CORP." As described above, other execution environments are possible. Further, the computer system of the present invention includes multiple execution environments.

The techniques disclosed herein are described in connection with terminology and resources that will be apparent to one of ordinary skill in the art of, for example, object-oriented programming. Specifically, the terminology and resources described are associated with the Common Object Request Broker Architecture ("CORBA"—a registered trademark of the Object Management Group, Inc.), an international standard for object management resources. A particular implementation of the CORBA standard is International Business Machines' Standard Object Model ("SOM") Objects Toolkit ("SOMobjects"). Further descriptions of CORBA and SOMobjects may be found in, e.g., "CORBA—A Guide To Common Object Request Broker Architecture," by Ron Ben-Natan, McGraw-Hill, 1995 and "AIX Version 4.1 SOMobjects Base Toolkit User's Guide," IBM, 1993. Publication No. SC23-2680-01, and "AIX Version 4.1 SOMobjects Base Toolkit Programmers Reference Manual," IBM 1993. Publication No. SC23-2681-01, which are incorporated herein by reference in their entireties. CORBA is only one example of an object-oriented environment within which the techniques disclosed herein will operate. The present invention is compatible with any object-oriented environment that includes an object manager (e.g., The Object Request Broker-ORB of CORBA) which enables transmittal of information between objects and provides object transparency (e.g., "Microsoft's Common Object Manager" environment or "VisualAge" environment from "IBM CORP.").

The term "affinity" is defined herein as a specified characteristic of an object or class, wherein the characteristic corresponds to a resource of an execution environment. Affinities may include, e.g., a processor type affinity, an operating system type affinity, a user interface type affinity, a printed output type affinity, and a database type affinity.

Further examples of affinities are included in an Affinity Resource Table ("ART"), one example of which is depicted in FIGS. 1A-1B. This table is stored in the computer system within which the present invention is implemented and is used in connection with the techniques described herein. Each entry in the Affinity Resource Table has an affinity, a description of the resource corresponding to the affinity and a location of the resource. The location of the resource is the name of at least one computer system (i.e., execution environment) that supports the resource. For example, the first entry in the Affinity Resource Table specifies a GUI affinity that corresponds to a requirement for any type of graphical user interface. As shown in the "GUI" affinity entry of the Affinity Resource Table of FIG. 1A, SYS A, SYS B and SYS C (i.e., systems named A, B and C) all have some form of GUI. Other GUI type affinities call for more specific types of GUIs including, e.g., an "IBM OS/2 Presentation Manager" GUI (affinity "GUI_OS2PM"), a "Microsoft Windows GUI" (affinity "GUI_WIN") and an "X-Windows" GUI (affinity "GUI_XWIN").

Other affinities are defined in the Affinity Resource Table of FIGS. 1A-1B similarly to the "GUI" type affinities discussed hereinabove. For the purposes of clarity and explanation, the affinities shown are grouped into General Resource Affinities, System Affinities, Hardware Affinities and Operating System Affinities. In implementation, no such grouping or distinction is necessary; all affinities are contained in the Affinity Resource Table as individual entries. Further, the types of affinities are not limited to those shown in the Affinity Resource Table of FIGS. 1A-1B. Any characteristic of an execution environment that may be advantageously associated with a class, may be separately listed in the Affinity Resource Table and used in connection with the techniques disclosed herein.

The General Resource Affinities shown in FIG. 1A include general hardware and software resources of the different execution environments (e.g., graphical, database and printer resources). System Affinities are included in the Affinity Resource Table, and enable a direct specification of a system name as the desired execution environment. Also included in the Affinity Resource Table (FIG. 1B) are Hardware Affinities, which enable different processor types to be specified by different classes. Further examples of affinity types shown in the Affinity Resource Table are Operating System Affinities that allow a class to specify an affinity for an execution environment having a particular operating system.

To enable the compilation of an object instantiated from a class for a computer system (i.e., execution environment) that corresponds to the affinities of the class, information about the computer system is required. This information includes, e.g., the type of processor and operating system used by the computer system. Therefore, included in the present invention is a System Environment Table ("SET") that includes, e.g., the processor type and operating system used by each system referenced in the Affinity Resource Table. One example of a SET is depicted in FIG. 2. In this example, system A ("SYS A") includes an "INTEL i486" processor executing an "IBM OS/2 version 2.1" operating system; system B ("SYS B") includes an "INTEL i486" processor executing a "MICROSOFT WINDOWS" version 3.1 operating system; and system C ("SYS C") includes an "IBM System/390 model 3090-400" processor executing an "MVS/ESA" version 3.1 operating system. Other processor types and operating systems are similarly supportable according to the techniques disclosed herein. The manner in which the SET and ART are used is described in further detail below.

Figure 3:
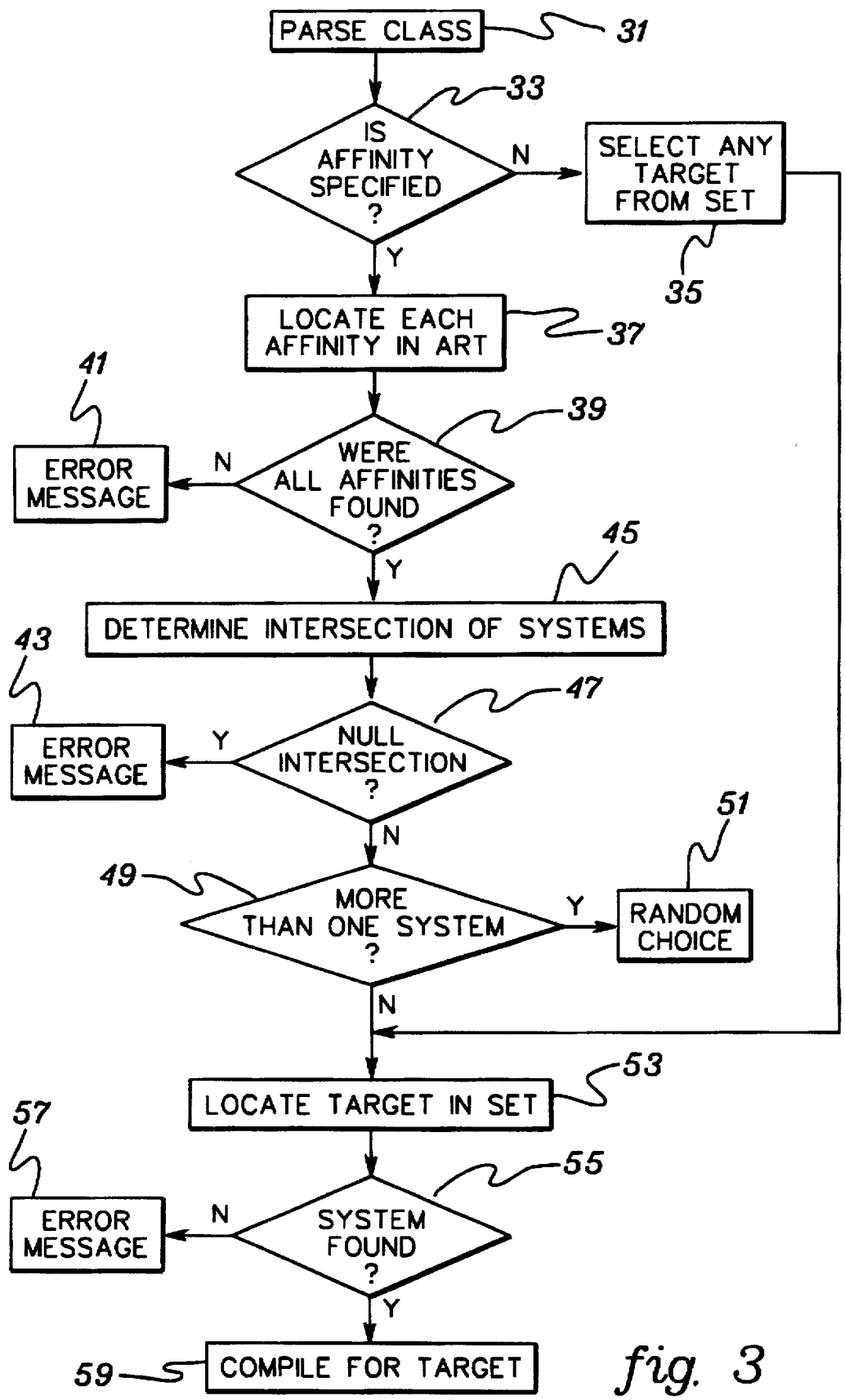
FIG. 3 is a flow-diagram of a method for compiling objects defined by classes based on affinities specified thereby in accordance with an embodiment of the present invention.

One example of the processing techniques of the present invention for compiling objects instantiated from (i.e., defined by) classes based upon the classes' affinities is shown in the flow-diagram of FIG. 3. Implementation of the individual steps of FIG. 3 will be apparent to one of ordinary skill in the art in view of this disclosure. An example implementation could be created using the C++ language (in, e.g., an "OS/2" or "MVS" based execution environment).

A first step according to one embodiment of the present invention includes parsing a current class (i.e., that a current object is defined by) to locate affinities specified therein, STEP 31. Affinities are specified using a directive. As one example, the directive may be formatted as follows:

AFFINITY(<affinity_name>,|,<more_affinity_names>|)
affinity_name - The name of an affinity designated by the class.
more_affinity_names - Optional additional affinity names designated by the class.

If no affinities are specified, INQUIRY 33, then the object is compiled for any available execution environment. The execution environment is accordingly chosen from the SET, STEP 35, using any predesignated selection scheme (e.g., random, the first listed system, or round-robin). Thereafter, compilation of the object is performed as described herein-below with regard to STEPS 53, 55, 57 and 59.

If an affinity statement is located, such that affinities are specified, INQUIRY 33, then the Affinity Resource Table is searched for each specified affinity, STEP 37. If all of the specified affinities are not found in the Affinity Resource Table, INQUIRY 39, then an error message is generated, STEP 41. The error message would indicate that none of the execution environments satisfy all of the affinities specified by the class(es) of the object being compiled.

Once all affinities have been located in the Affinity Resource Table, INQUIRY 39, the intersection of the sets of systems corresponding to the specified affinities is determined, STEP 45. A system that supports all of the specified affinities is therefore determined. If, however, the intersection is null, INQUIRY 47, then an error message is generated indicating that no single available system has all of the affinities specified by the class being compiled, STEP 43.

The determination of which system supports all of the specified affinities in the class may result in more than one system being identified, INQUIRY 49. In such a situation, one system is chosen by, e.g., random selection among the systems supporting all of the affinities specified by the class, STEP 51.

To continue, the above described steps result in a determination of a system that supports all of the affinities specified by the subject class. This system is located in the SET, and execution environment parameters corresponding to the system, and stored in the SET, are retrieved, STEP 53 (e.g., processor type and operating system). If the system cannot be located within the SET, INQUIRY 55, then an appropriate error message is generated, STEP 57.

Once execution environment parameters have been determined, the object instantiated from the class is compiled, STEP 59. In particular, compilation is performed using, for example, a compiler dedicated to the determined execution environment, or a selectable target compiler configured for the determined execution environment. Configuring the selectable target compiler is performed using the execution environment parameters retrieved from the SET (e.g., the processor type and operating system). One example of a selectable target compiler is MicroFocus COBOL. The steps of this embodiment of the present invention are thereby complete.

By way of further explanation, the techniques of the present invention are described below with respect to two example classes (it is assumed that objects instantiated from each of the foregoing classes are to be compiled).

A first example class definition is shown below in a hypothetical programming language form. This class provides a database record look up function.

```
class Database_Lookup
{
    #AFFINITY(DB_REL)
    void record_lookup(recno);
}
```

A "DB_REL" affinity is specified by the class. Therefore, according to the techniques of the present invention, "DB_EREL" is looked-up in the Affinity Resource Table. As shown in the example Affinity Resource Table of FIG. 1, DB_REL corresponds to an affinity for any system that has a relational database facility. In the example Affinity Resource Table of FIG. 1, only system C ("SYS C") supports this affinity. Pursuant to the present invention, system C is looked-up in the SET (e.g., FIG. 2), and it is determined that system C is an "IBM System/390 model 3090-400" processor executing an "MVS/ESA version 3.1" operating system. The object is compiled for this execution environment using an appropriate compiler (e.g., a dedicated compiler for the determined system, or selectable target compiler set therefor).

A second example class definition is shown below in hypothetical programming language form. This class provides a database record printing and graphical display function.

```
class Output_Records
{
    #AFFINITY(GUI, PRT_GRAPH)
    void record_output(recno)
}
```

A "GUI" affinity and a "PRT GRAPH" affinity are specified by the class. According to the techniques of the present invention, both affinities are looked-up in the Affinity Resource Table. As shown in the example Affinity Resource Table of FIG. 1A. "GUI" is an affinity for a system that has any graphical user interface type. Systems A, B and C correspond to the affinity "GUI." The affinity "PRT_ GRAPH" corresponds to any system having graphical printed output capability. Both systems A and C support this affinity. According to the present invention, the intersection of the sets of systems that support the "GUI" and "PRT_ GRAPH" affinities is taken. Specifically, the set including systems A, B and C is intersected with the set including systems A and C, resulting in a set including systems A and C. Because both systems A and C support all of the specified affinities, a random selection between these two systems, as one example, is performed. Assuming system A is the result of the random choice, system A is looked-up in the SET (e.g., FIG. 2), and it is determined that system A is an "INTEL i486" based computer executing an "IBM OS/2 version 2.1" operating system. The object is compiled for this execution environment using an appropriate compiler.

In the foregoing examples, it is assumed that the "AFFINITY" statements are manually inserted into classes upon their creation. However, as an enhancement, this insertion of "AFFINITY" statements into the source code that defines classes can be automated. For example, in a visual development environment, affinities may be presented to a programmer as icons on a pallet. The programmer may "drag" one of the affinity icons over another icon that corresponds to a class and "drop" the affinity thereon. The appropriate "AFFINITY" statement would accordingly be added to the source code of the class. For example, a GUI affinity icon (e.g., an icon picturing windows) could be dropped onto an icon corresponding to a user-interactive class, and as a result, an "#AFFINITY(GUI)" statement would be added to the class' source code. The individual steps required to add this feature to a visual development environment will be apparent to one of ordinary skill in the art in view of this disclosure. Examples of visual development environments include "VisualAge", described in "Visual Age : Concepts and Features, "IBM Document Number GG24-3946-00," March 1994; "Visual Builders User's Guide," IBM Document Number S25H-6960-00, June 1995, which are both hereby incorporated herein by reference in their entireties.

Described above are examples of techniques for compiling objects instantiated from classes to execution environments that supports affinities of the classes. It will be apparent to those of ordinary skill in the art that the above-described flows and sequences of steps are only examples. There can be many variations to the above, including, for instance, processing more or less than the steps described above, modifying one or more of the steps, or changing the order of some of the steps without departing from the true spirit and scope of the present invention. These variations are, therefore, considered a part of the claimed invention.

To summarize, the present invention has several advantages and features associated with it. Objects instantiated from classes, and defined within a single source code file are automatically compiled for execution environments that satisfy affinities of the classes. Accordingly, a programmer no longer has to manually evaluate the characteristics of different execution environments with regard to the requirements of individual classes. Furthermore, regardless of the execution environment that the objects will be compiled for, the classes from which the objects are instantiated may all originate in a single source code file (as opposed to individual source code files for the objects of each execution environments). Maintenance and management of source code is thus simplified.

While the invention has been described in detail herein, in accordance with certain preferred embodiments thereof, many modifications and changes thereto may be affected by those skilled in the art. Accordingly, it is intended by the appended claims to cover all such modifications and changes as fall within the true spirit and scope of the invention.

We claim:

1. In a computing system, including a plurality of execution environments, a method of automatically compiling an object defined by a class, said method comprising:

(a) providing said object defined by said class to said computing system, said class having an affinity defined therewith or an affinity derived implicitly by said computing system, said affinity corresponding to an execution environment-type characteristic, which is a run-time property for execution;

(b) automatically determining, by the computing system, a subset of said plurality of execution environments satisfying said affinity;

(c) selecting an execution environment from said subset; and (d) automatically compiling said object defined by said class for said selected execution environment.

2. The method of claim 1, further comprising providing said computing system with an affinity resource table, said affinity resource table including a plurality of affinity entries, each affinity entry of said plurality of affinity entries including an affinity value and at least one execution environment having said affinity value, and wherein said automatically determining comprises looking-up said affinity in said affinity values of said affinity resource table to determine said subset of said plurality of execution environments.

3. The method of claim 2, wherein said providing said object defined by said class further comprises providing said class having a plurality of affinities, and wherein said automatically determining further comprises looking up each affinity of said plurality of affinities in said affinity values of said affinity resource table, and said selecting comprises selecting said selected execution environment as a common execution environment to each subset of said execution environments satisfying each affinity value of said plurality of affinity values looked up within said affinity resource table.

4. The method of claim 3, wherein if multiple execution environments are common to each affinity value looked-up in said affinity resource table, said method further comprises randomly selecting one execution environment of said multiple execution environments common to each affinity value looked-up in said affinity resource table as said selected execution environment.

5. The method of claim 2, where said affinity comprises one of a processor type affinity, an operating system type affinity, a user interface type affinity, a printed output type affinity, and a database type affinity.

6. The method of claim 1, further comprising providing said computing system with a system environment table, said system environment table having a plurality of system entries, at least one system entry having an execution environment and at least one compilation parameter for said execution environment, and wherein said automatically compiling comprises looking-up said selected execution environment in said system environment table, and compiling said object defined by said class using said at least one compilation parameter corresponding to said selected execution environment within said system environment table.

7. The method of claim 6, wherein said at least one compilation parameter includes at least one of a processor type and an operating system.

8. The method of claim 7, wherein said automatically compiling further comprises setting a selectable target compiler for a target comprising said at least one of said processor type and said operating system and compiling said class using said selectable target compiler.

9. The method of claim 1, wherein said providing further comprises providing multiple objects, each defined by at least one class, a first class of said at least one class having an affinity, said affinity corresponding to an execution environment-type characteristic, and wherein said automatically determining further comprises, for each first class, automatically determining an execution environment of said plurality of execution environments satisfying the affinity of said first class, wherein a selected execution environment for said first class is determined, and wherein said automatically compiling further comprises, for each first class, automatically compiling said object defined by said first class for its selected execution environment.

10. The method of claim 9, wherein said automatically compiling comprises compiling at least two objects of said multiple objects for different execution environments.

11. The method of claim 1, wherein said computing system includes a visual development environment, and wherein said providing said class having said affinity includes said visual development environment presenting a first icon and a second icon to a user, said first icon corresponding to said class and said second icon corresponding to said affinity, said second icon being droppable by said user on said first icon to associate said affinity with said class.

12. In a computing system including a plurality of execution environments, a system used in automatically compiling an object defined by a class, said system, comprising:

means for providing said object defined by said class to said computing system, said class having an affinity defined therewith or affinity derived implicitly by said computing system, said affinity corresponding to an execution environment-type characteristic, which is a run-time property for execution;

means for automatically determining, by said computing system, a subset of said plurality of execution environments satisfying said affinity;

means for selecting execution environment from said subset; and means for automatically compiling said object defined by said class for said selected execution environment.

13. The system of claim 12, further comprising means for providing said computing system with an affinity resource table, said affinity resource table including a plurality of affinity entries, each affinity entry of said plurality of affinity entries including an affinity value and at least one execution environment having said affinity value, and wherein said means for automatically determining comprises means for looking-up said affinity in said affinity values of said affinity resource table to determine said subset of said plurality of execution environments.

14. The system of claim 13, wherein said means for providing said object defined by said class further comprises means for providing said class having a plurality of affinities, and wherein said means for automatically determining further comprises means for looking up each affinity of said plurality of affinities in said affinity values of said affinity resource table, and said means for selecting comprises means for selecting said selected execution environment as a common execution environment to each subset of said execution environments satisfying each affinity value of said plurality of affinity values looked up within said affinity resource table.

15. The system of claim 14, wherein if multiple execution environments are common to each affinity value looked-up in said affinity resource table, said system further comprises means for randomly selecting one execution environment of said multiple execution environments common to each affinity value looked-up in said affinity resource table as said selected execution environment.

16. The system of claim 13, where said affinity comprises one of a processor type affinity, an operating system type affinity, a user interface type affinity, a printed output type affinity, and a database type affinity.

17. The system of claim 12, further comprising means for providing said computing system with a system environment table, said system environment table having a plurality of system entries, at least one system entry having an execution environment and at least one compilation parameter for said execution environment, and wherein said means for automatically compiling comprises means for looking-up said selected execution environment in said system environment table, and means for compiling said object defined by said class using said at least one compilation parameter corresponding to said selected execution environment within said system environment table.

18. The system of claim 17, wherein said at least one compilation parameter includes at least one of a processor type and an operating system.

19. The system of claim 18, wherein said means for automatically compiling further comprises means for setting a selectable target compiler for a target comprising said at least one of said processor type and said operating system and means for compiling said class using said selectable target compiler.

20. The system of claim 12, wherein said means for providing further comprises means for providing multiple objects, each defined by at least one class, a first class of said at least one class having an affinity, said affinity corresponding to an execution environment-type characteristic, and wherein said means for automatically determining further comprises, for each first class, means for automatically determining an execution environment of said plurality of execution environments satisfying the affinity of said first class, wherein a selected execution environment for said class is determined, and wherein said means for automatically compiling further comprises, for each first class, means for automatically compiling said object defined by said first class for its selected execution environment.

21. The system of claim 20, wherein said means for automatically compiling comprises means for compiling at least two objects of said multiple objects for different execution environments.

22. The system of claim 12, wherein said system includes a visual development environment, and means for said visual development environment providing a first icon and a second icon to a user, said first icon corresponding to said class and said second icon corresponding to said affinity, said second icon being droppable by said user on said first icon to associate said affinity with said class.

* * * * *